US009069459B2

(12) United States Patent
Driver et al.

(10) Patent No.: US 9,069,459 B2
(45) Date of Patent: Jun. 30, 2015

(54) MULTI-THREADED CONDITIONAL PROCESSING OF USER INTERACTIONS FOR GESTURE PROCESSING USING RENDERING THREAD OR GESTURE PROCESSING THREAD BASED ON THRESHOLD LATENCY

(75) Inventors: David Owen Driver, Seattle, WA (US); Philomena Francisca Lobo, Redmond, WA (US); Xun Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1080 days.

(21) Appl. No.: 13/099,388

(22) Filed: May 3, 2011

(65) Prior Publication Data
US 2012/0284663 A1  Nov. 8, 2012

(51) Int. Cl.
  G06F 3/048  (2013.01)
  G06F 3/0488  (2013.01)
  G06F 3/0485  (2013.01)
  G06F 9/44  (2006.01)
  G06F 9/50  (2006.01)

(52) U.S. Cl.
  CPC .......... *G06F 3/04883* (2013.01); *G06F 3/0485* (2013.01); *G06F 9/4443* (2013.01); *G06F 9/505* (2013.01); *G06F 2209/5018* (2013.01); *G06F 2209/501* (2013.01)

(58) Field of Classification Search
  CPC ... G06F 3/0485; G06F 3/04883; G06F 9/505; G06F 9/4443; G06F 2209/501; G06F 2209/5018
  USPC .................................. 718/102; 715/784, 863
  See application file for complete search history.

(56) References Cited

U.S. PATENT DOCUMENTS

| 7,436,535 | B2 | 10/2008 | Dodge et al. |
| 7,461,353 | B2 | 12/2008 | Rohrabaugh et al. |
| 7,614,019 | B2 | 11/2009 | Rimas Ribikauskas et al. |
| 7,636,794 | B2 | 12/2009 | Ramos et al. |
| 7,739,658 | B2 * | 6/2010 | Watson et al. ................ 717/108 |
| 7,760,905 | B2 | 7/2010 | Rhoads et al. |
| 8,130,205 | B2 * | 3/2012 | Forstall et al. ................ 345/173 |
| 8,533,103 | B1 * | 9/2013 | Certain et al. .................. 705/37 |

(Continued)

OTHER PUBLICATIONS

Kray, et al., "User-Defined Gestures for Connecting Mobile Phones, Public Displays, and Tabletops", Retrieved at << http://www.medien.ifi.lmu.de/pubdb/publications/pub/kray2010gestures/kray2010gestures.pdf >>, 12th International Conference on Human Computer Interaction with Mobile Devices and Services, Sep. 7-10, 2010, pp. 239-248.

*Primary Examiner* — Meng An
*Assistant Examiner* — Abu Ghaffari
(74) *Attorney, Agent, or Firm* — Aneesh Mehta; Kate Drakos; Micky Minhas (57) ABSTRACT

Embodiments isolate gesture processing for improved user interactivity with content. A first thread detects user interaction with a document via a touch sensor associated with a computing device. A latency associated with a second thread is calculated. The calculated latency is compared to a threshold latency. Based on the comparison, the first thread determines whether to transfer processing of the detected user interaction from the first thread to the second thread. The detected user interaction is processed by the first thread or by the second thread based on the determination. In some embodiments, users are provided with smooth interactivity such as panning and scrolling when browsing web content with a browser executing on a mobile computing device.

20 Claims, 5 Drawing Sheets

(56) References Cited

U.S. PATENT DOCUMENTS

| | | | |
|---|---|---|---|
| 2002/0051018 A1* | 5/2002 | Yeh ................................ | 345/784 |
| 2006/0026521 A1 | 2/2006 | Hotelling et al. | |
| 2006/0031786 A1* | 2/2006 | Hillis et al. ................... | 715/863 |
| 2008/0204424 A1* | 8/2008 | Jin et al. ........................ | 345/173 |
| 2010/0174979 A1* | 7/2010 | Mansfield et al. ............ | 715/234 |
| 2010/0199230 A1 | 8/2010 | Latta et al. | |
| 2011/0169748 A1* | 7/2011 | Tse et al. ....................... | 345/173 |
| 2011/0214092 A1* | 9/2011 | Palmer et al. ................. | 715/863 |

* cited by examiner

FIG. 5

MULTI-THREADED CONDITIONAL PROCESSING OF USER INTERACTIONS FOR GESTURE PROCESSING USING RENDERING THREAD OR GESTURE PROCESSING THREAD BASED ON THRESHOLD LATENCY

BACKGROUND

Mobile devices provide increasing functionality and high-quality graphics. The functionality is accessible by users via interfaces such as touch screens that accept gestures input by the users. Responsiveness from the touch screens suffers due to other processes executing on the mobile devices. For example, many applications executing on the mobile devices are single-threaded. For such applications, if a processor-intensive operation is performed (e.g., execution of a script), responsiveness of user interactivity with the mobile device suffers. As such, while some existing systems can process user interactions in approximately 800 milliseconds, such a delay is noticeable to users who can detect delays of 150 milliseconds.

SUMMARY

Embodiments of the disclosure separate gesture processing from rendering processing. A first thread detects user interaction with a document via a touch sensor associated with a computing device. The first thread handles gesture processing. A latency associated with a second thread is calculated. The second thread handles rendering of the document. The calculated latency is compared to a threshold latency. Based on the comparison, the first thread determines whether to transfer processing of the detected user interaction from the first thread to the second thread. The detected user interaction is processed by the first thread or by the second thread based on the determination.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure dynamically isolate gesture processing from rendering processing and other processing by using a multi-threaded architecture conditioned on latency. In some embodiments, touch interactivity such as scrolling performance for web content is enhanced by faster display of content. Additional touch interactivity benefitting from the disclosure includes gestures such as pan gestures, pinch/stretch gestures, flick gestures, and double-tap zoom gestures. However, aspects of the disclosure are operable with any user interactions. That is, aspects of the disclosure are not limited to particular user interactions, or to a pre-determined or pre-designated subset of user interactions or processes. In operation, aspects of the disclosure improve user interaction with documents (e.g., documents 120), applications (e.g., applications 118), and other content by, for example, enabling a user 104 to interact with a web page in a browser instantaneously with smooth panning, scrolling, and the like with reduced checkerboard.

Figure 1:
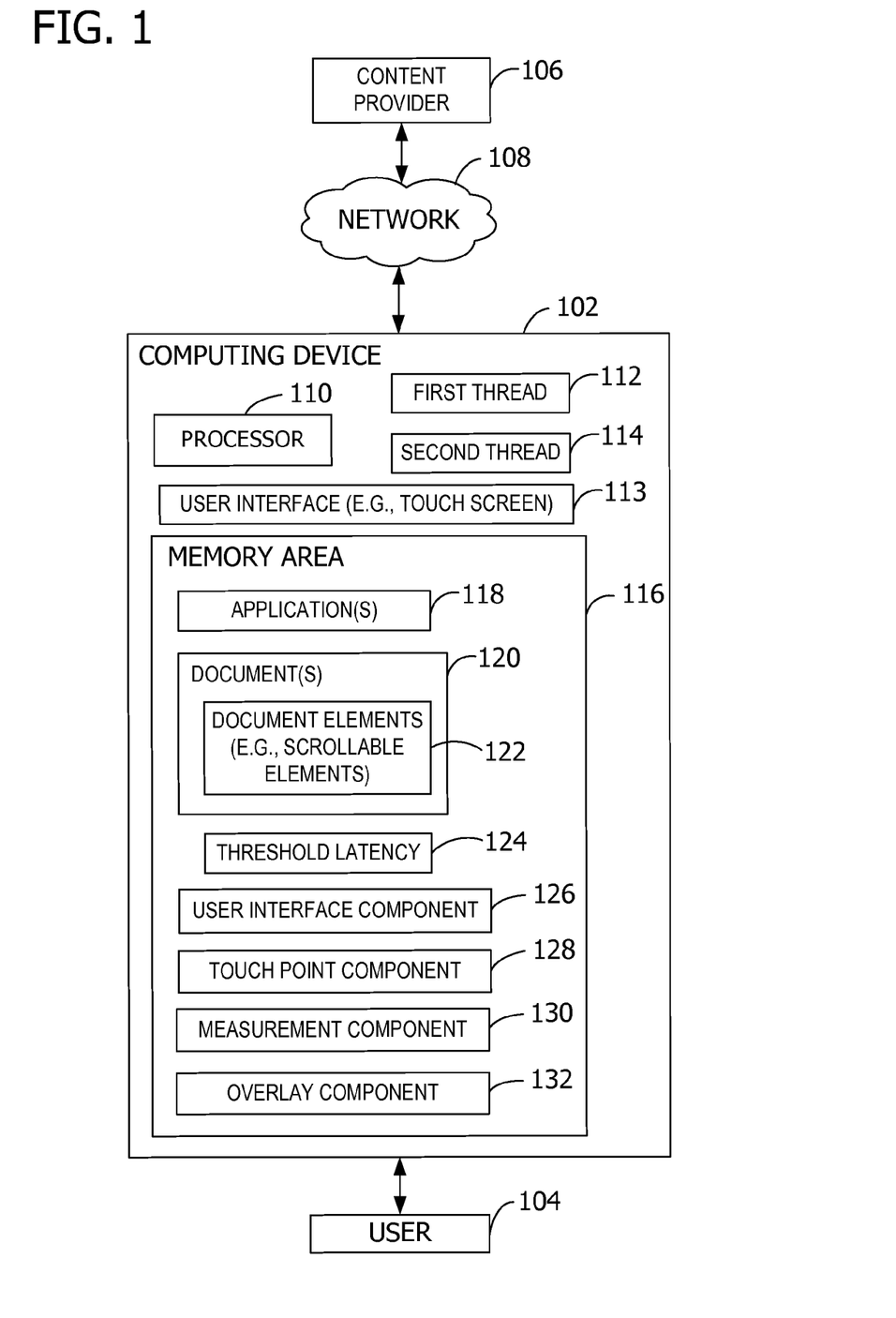
FIG. 1 is an exemplary block diagram illustrating a computing device having computer-executable components for separating gesture processing from rendering processing.

Referring next to FIG. 1, an exemplary block diagram illustrates a computing device 102 having computer-executable components for separating gesture processing from rendering processing. In the example of FIG. 1, the computing device 102 is associated with the user 104. The computing device 102 represents any device executing instructions (e.g., as application programs, operating system functionality, or both) to implement the operations and functionality associated with the computing device 102. The computing device 102 may include a mobile computing device or any other portable device. In some embodiments, the mobile computing device includes a mobile telephone, laptop, tablet, computing pad, netbook, gaming device, and/or portable media player. The computing device 102 may also include less portable devices such as desktop personal computers, kiosks, and tabletop devices. Additionally, the computing device 102 may represent a group of processing units or other computing devices.

The computing device 102 has at least one processor 110, a plurality of threads, a memory area 116, and at least one user interface 113. The processor 110 includes any quantity of processing units, and is programmed to execute computer-executable instructions for implementing aspects of the disclosure. The instructions may be performed by the processor 110 or by multiple processors executing within the computing device 102, or performed by a processor external to the computing device 102. In some embodiments, the processor 110 is programmed to execute instructions such as those illustrated in the figures (e.g., FIG. 2 and FIG. 3).

The computer device further has a plurality of threads or processes such as a first thread 112 and a second thread 114. Each of the threads represents a unit of processing that is capable of being scheduled for performance or execution by the computing device 102.

The computing device 102 further has one or more computer readable media such as the memory area 116. The memory area 116 includes any quantity of media associated with or accessible by the computing device 102. The memory area 116 may be internal to the computing device 102 (as shown in FIG. 1), external to the computing device 102 (not shown), or both (not shown).

The memory area 116 stores, among other data, one or more applications 118. The applications 118, when executed by the processor 110, operate to perform functionality on the computing device 102. Exemplary applications 118 include mail application programs, web browsers, calendar application programs, address book application programs, messaging programs, media applications, location-based services, search programs, and the like. The applications 118 may communicate with counterpart applications or services such as web services accessible via a network 108. For example, the applications 118 may represent downloaded client-side applications that correspond to server-side services executing in a cloud.

The applications 118 may also interact with the user 104 by receiving or displaying data via, for example, a touch screen or other user interface 113 associated with the computing device 102. The touch screen represents one or more touch sensors in any arrangement, collection, configuration, or organization for communicating with the user 104. For example, the touch screen may be a touch pad associated with a laptop, a full screen of a mobile computing device or tablet device, and/or a fingerprint biometric pad (e.g., for logging in).

The memory area 116 further stores or caches one or more documents 120 or portions thereof. Exemplary documents 120 include web pages, hypertext markup language documents, word processing documents, or the like. Each of the documents 120 may have one or more document elements 122 associated therewith. For example, the documents 120 may include frames, panels, subpanel, popups, and the like. The document elements 122 are adjustable or configurable by the user 104 via, in some embodiments, the user interface 113 (e.g., touch screen). For example, the document elements 122 may be capable of being scrolled, zoomed, panned, re-sized, etc. In some embodiments, the documents 120 are received from a content provider 106 (e.g., server) via network 108, such as when the user 104 browses web sites.

The memory area 116 further stores a threshold latency 124. The threshold latency 124 represents a value or criteria used to determine whether or not to assign a requested user interaction to a particular thread, and/or whether or not to transfer processing of the requested user interaction from one thread to another. The threshold latency 124 is based upon, for example, the ability of the user 104 to perceive or otherwise notice delays associated with interaction with the computing device 102. An exemplary latency is 50 milliseconds. Use of the threshold latency 124 is described below with reference to FIG. 2 and FIG. 3.

The memory area 116 further stores one or more computer-executable components that, when executed by the processor 110, cause the processor 110 to separate gesture processing from rendering processing. Exemplary components include a user interface component 126, a touch point component 128, a measurement component 130, and an overlay component 132. Execution of the computer-executable components is described below with reference to FIG. 2.

Figure 2:
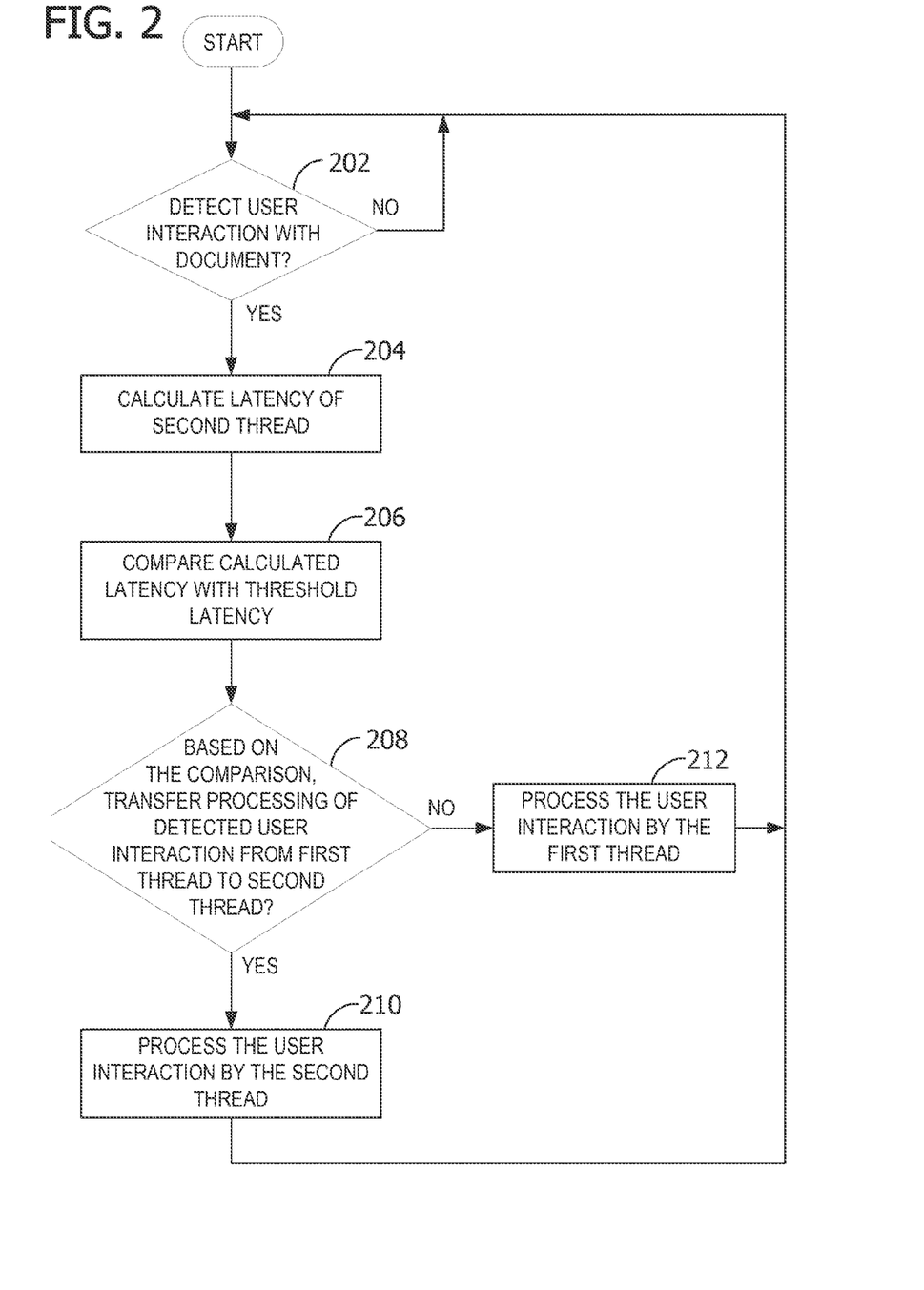
FIG. 2 is an exemplary flow chart illustrating operation of the computing device to select a thread to process a user interaction.

Referring next to FIG. 2, an exemplary flow chart illustrates operation of the computing device 102 to conditionally select a thread to process a user interaction with the document 120. The document 120 may include, for example, a web page and/or data displayed by an executing application program (e.g., application 118). In the example of FIG. 2, the first thread 112 handles gesture processing and the second thread 114 handles rendering processing. In some embodiments, the first thread 112 corresponds to a fast response thread while the second thread 114 corresponds to a slow response thread. If user interaction with the document 120 via a touch sensor is detected at 202 by the first thread 112, a latency associated with the second thread 114 is calculated at 204. For example, detecting the user interaction includes detecting user interaction with a web page.

In some embodiments, calculating the latency includes requesting, from the second thread 114, touch point data associated with the detected user interaction, or otherwise performing a "hit test" of the second thread 114. An elapsed time since the request is calculated. The latency is then determined based at least on the calculated elapsed time. In embodiments in which portions of the touch point data are provided by the second thread 114 asynchronously, the latency may be determined when a particular element of the touch point data is received (e.g., specific to a particular gesture), when a particular quantity of elements are received, or the like.

The calculated latency is compared to the threshold latency 124 at 206. Based on the comparison, the computing device 102 determines whether to transfer processing of the user interaction to the second thread 114 at 208. If the computing device 102 decides to transfer processing to the second thread 114, the second thread 114 processes the user interaction at 210. For example, if the second thread 114 provides the requested touch point data or otherwise responds to the first thread 112 within the latency threshold, the first thread 112 may proceed to transfer processing of the user interaction to the second thread 114. In some embodiments, the second thread 114 processes the detected user interaction if the calculated latency is less than the threshold latency 124.

If the computing device 102 decides not to transfer processing to the second thread 114, the first thread 112 processes the user interaction at 212. For example, if the second thread 114 fails to provide the requested touch point data or otherwise respond to the first thread 112, the first thread 112 proceeds to process the user interaction. In some embodiments, the first thread 112 processes the detected user interaction if the calculated latency is greater than the threshold latency 124.

Depending on how the threshold latency 124 is defined, the decision at 208 may be performed using any relative comparison of the threshold latency 124 and the calculated latency. Exemplary comparison criteria include one or more of the following: greater than, greater than or equal to, less than, and less than or equal to.

In some embodiments, the first thread 112 determines an operation associated with the detected user interaction by analyzing the touch point data received from the second thread 114. For example, the first thread 112 may correlate the touch point data with a gesture. Based on the gesture, the first thread 112 determines what operation to perform on the document 120. In instances in which the first thread 112 processes the detected user interaction, the first thread 112 may apply the operation to a version of the document 120 cached by the computing device 102. In instances in which the second thread 114 processes the detected user interaction, the first thread 112 identifies the determined operation to the second thread 114 during transfer of the user interaction processing to the second thread 114. The second thread 114 then applies the operation to the document 120. For example, the second thread 114 applies the operation to a "live" or fresh version of the document 120 stored by another computing device (e.g., content provider 106).

The computer-executable components illustrated in FIG. 1 operate to implement the functionality illustrated in FIG. 2. For example, the user interface component 126, when executed by the processor 110, causes the processor 110 to detect, by the fast response thread, user interaction with the document 120 via the touch sensor associated with the computing device 102. In some embodiments, the user interface component 126 includes a graphics card for displaying data to the user 104 and receiving data from the user 104. The user interface component 126 may also include computer-executable instructions (e.g., a driver) for operating the graphics card. Further, the user interface component 126 may include a display (e.g., a touch screen display) and/or computer-executable instructions (e.g., a driver) for operating the display. The user interface component 126 may also include one or more of the following to provide data to the user 104 or receive data from the user 104: speakers, a sound card, a camera, a microphone, a vibration motor, one or more accelerometers, a BLUETOOTH brand communication module, global positioning system (GPS) hardware, and a photoreceptive light sensor. For example, the user 104 may input commands or manipulate data by moving the computing device 102 in a particular way.

The touch point component 128, when executed by the processor 110, causes the processor 110 to request, from the slow response thread by the fast response thread, touch point data corresponding to the user interaction detected by the user interface component 126. The requested touch point data is associated with an operation to be applied to at least a portion of the document 120. For example, the user interaction corresponds to a gesture and the operation includes a scrolling operation.

The measurement component 130, when executed by the processor 110, causes the processor 110 to compare, by the fast response thread, a latency associated with the slow response thread to the threshold latency 124. The overlay component 132, when executed by the processor 110, causes the processor 110 to apply, based on the comparison performed by the measurement component 130, the operation by the fast response thread to the entire document 120 or by the slow response thread to only the portion of the document 120 associated with the received touch point data. For example, the overlay component 132 applies the operation by the fast response thread to the entire document 120 if the latency violates the threshold latency 124. In another example, the overlay component 132 applies the operation by the slow response thread to only the portion of the document 120 if the latency satisfies the threshold latency 124.

Figure 3:
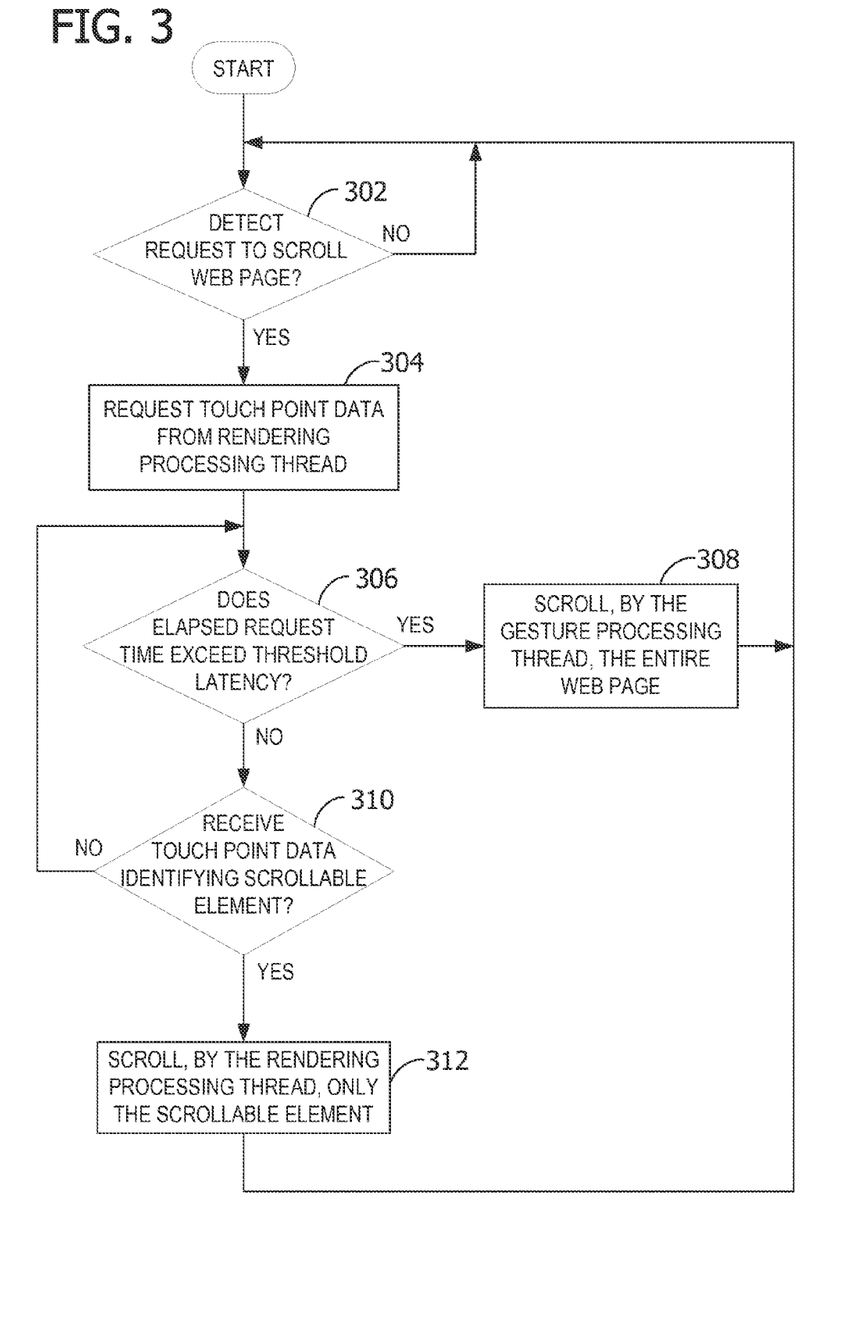
FIG. 3 is an exemplary flow chart illustrating operation of the computing device to select a thread to scroll a web page

Referring next to FIG. 3, an exemplary flow chart illustrates operation of the computing device 102 to select a thread to scroll a web page. The web page may be displayed from, for example, a web site on the Internet. In the example of FIG. 3, a gesture processing thread handles gesture processing and a rendering processing thread handles rendering processing. In some embodiments, the gesture processing thread corresponds to a fast response thread while the rendering processing thread corresponds to a slow response thread. If a request from the user 104 to scroll the web page via a touch sensor is detected by the gesture processing thread at 302, touch point data is requested from the rendering processing thread at 304. The touch point data describes one or more of the following: whether the touch point is scrollable, whether the touch point is editable, and the shape of the touch point. Further, the touch point data identifies, or may be correlated to, one or more of the scrollable elements within the web page.

A latency associated with the rendering processing thread is next calculated based on the time elapsed since the request for the touch point data was sent. The calculated latency is compared to the threshold latency 124. The gesture processing thread waits until the elapsed request time exceeds the threshold latency 124 or the requested touch point data is received. If the elapsed request time exceeds the threshold latency 124 at 306, the gesture processing thread scrolls the entire web page at 308. If the requested touch point data is received at 310, the rendering processing thread scrolls only the scrollable elements identified by, or corresponding to, to the touch point data at 312. For example, the gesture processing thread "hands off" or otherwise transfers processing of the request from the user 104 to scroll the web page to the rendering processing thread.

Figure 4:
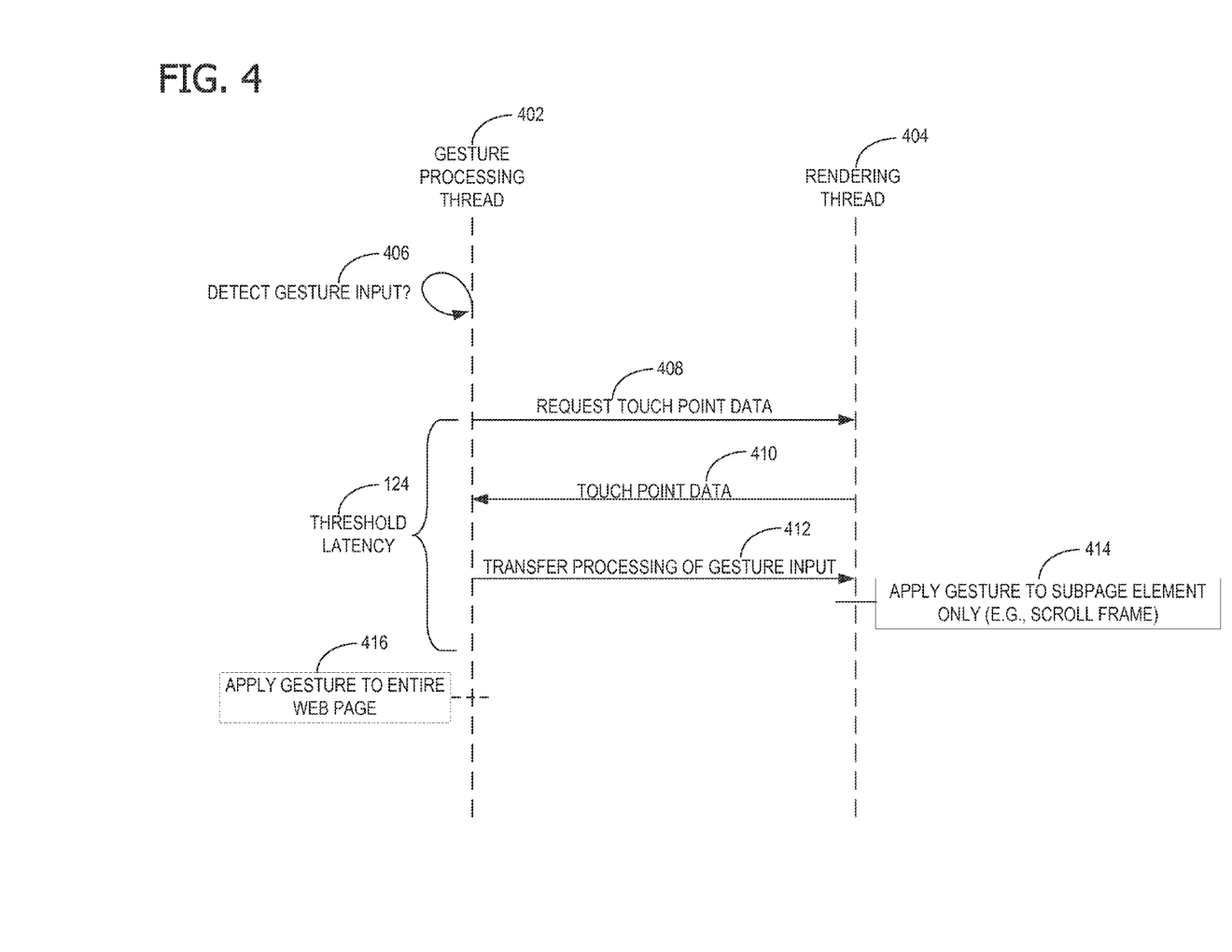
FIG. 4 is an exemplary sequence diagram illustrating thread selection for processing gesture inputs.

Referring next to FIG. 4, an exemplary sequence diagram illustrates thread selection for processing gesture inputs. In the example of FIG. 4, the gesture input is processed by the gesture processing thread 402 or the rendering thread 404, depending on the latency of the rendering thread 404 as next described. After the gesture processing thread 402 detects the gesture input at 406 (e.g., a scroll request or other user input request), the gesture processing thread 402 requests touch point data at 408 corresponding to the detected gesture input from the rendering thread 404. If the rendering thread 404 provides the requested touch point data at 410 to the gesture processing thread 402 within the threshold latency 124, the gesture processing thread 402 transfers processing of the gesture input to the rendering thread 404 at 412. The rendering thread 404 then applies or performs the gesture to the particular subpage element identified in the touch point data at 414 (e.g., a frame or other scrollable element), and not to the entire web page.

Alternatively, if the rendering thread 404 fails to provide the requested touch point data to the gesture processing thread 402 within the threshold latency 124 (e.g., 50 milliseconds), the gesture processing thread 402 processes the gesture input by applying or performing the gesture to the entire web page at 416, rather than to any subpage element.

Figure 5:
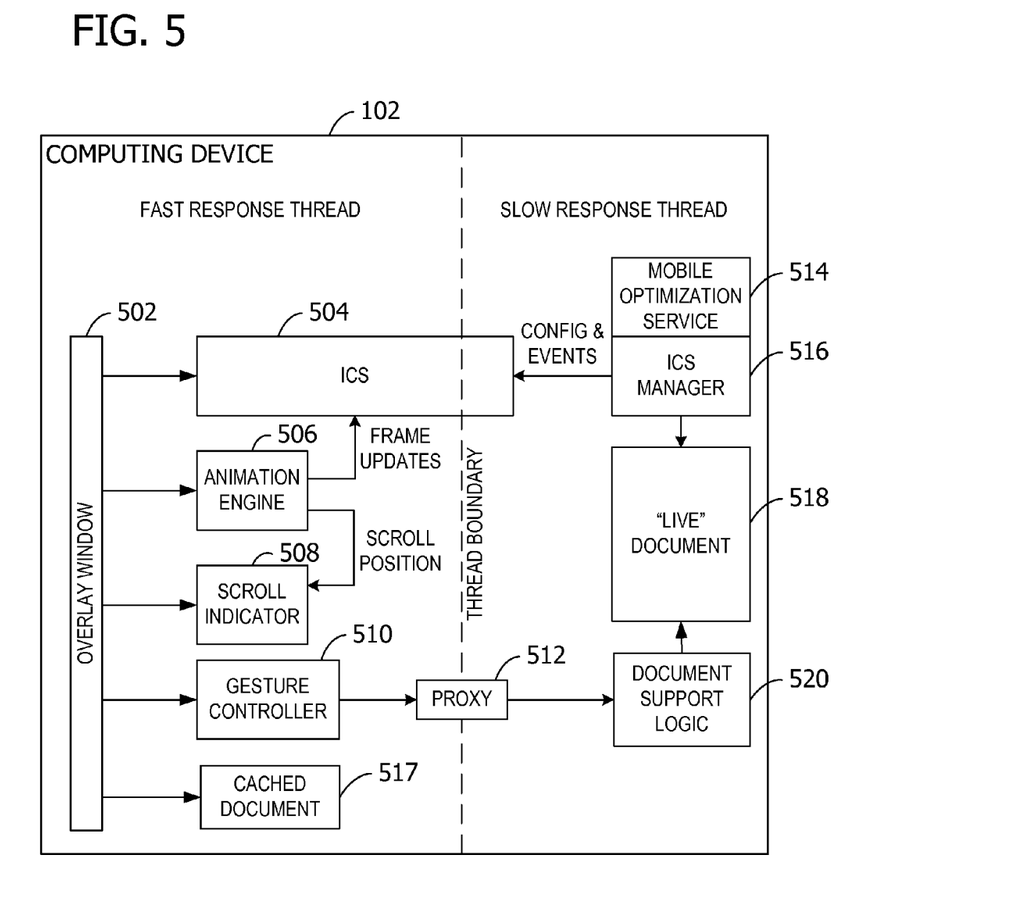
FIG. 5 is an exemplary block diagram illustrating the computing device with a multi-threaded architecture for separating gesture processing from rendering processing.

Referring next to FIG. 5, an exemplary block diagram illustrates the computing device 102 with a multi-threaded architecture for separating gesture processing from rendering processing. In the example configuration of FIG. 5, the fast response thread generally handles gesture processing, while the slow response thread handles rendering processing. While the threads are described as "fast" and "slow" to distinguish between the threads, aspects of the disclosure are operable with any threads that can be distinguished from each other in any way. For example, both threads may respond very quickly, but one thread responds slightly faster than the other does. The slightly faster thread may be designated the "fast response thread" while the slightly slower thread may be designated the "slow response thread."

The fast response thread is responsible for an overlay window 502, ICS 504, animation engine 506, scroll indicator 508, and gesture controller 510. The animation engine 506 directs animation results (e.g., frame updates via a frame renderer) directly to ICS 504 and scroll position to the scroll indicator 508. The gesture controller 510 uses a proxy 512 to cross a thread boundary to access document support logic 520 on the slow response thread. The slow response thread is further responsible for a mobile optimization service 514 and an ICS manager 516.

In the example of FIG. 5, the fast response thread operates on a cached version of a document 517, while the slow response thread operates on a "live" version of a document 518 obtained from, for example, the content provider 106.

Additional Examples

In some embodiments, the disclosure is operable with content other than document 120. For example, aspects of the disclosure are operable with applications (e.g., applications 118), media files, games, and/or any other content. In such embodiments, the operation corresponding to the input user interaction is applied to the content. For example, the user 104 may scroll a portion of the user interface 113 displayed by one of the applications 118.

While embodiments have been described herein with reference to selecting a thread to process particular user interactions, aspects of the disclosure are operable to select a thread to process any user interaction.

In an example scenario, aspects of the disclosure execute to process gestures within 50 milliseconds of input by the user 104. For example, the operations illustrated in FIG. 3 execute within the 50 milliseconds.

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 2 and FIG. 3 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 104. In such embodiments, notice is provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer readable storage media and communication media. Computer readable storage media store information such as computer readable instructions, data structures, program modules or other data. Computer readable storage media exclude propagated data signals. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for separating gesture processing from rendering processing, and exemplary means for latency-based conditional transfer of gesture processing from one thread to another.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for separating gesture processing from rendering processing, said system comprising:
    a memory area associated with a mobile computing device, said memory area storing at least a portion of a web page and one or more of a plurality of scrollable elements associated therewith, said memory area further storing a threshold latency, the threshold latency being based upon a noticeable delay in interaction with the mobile computing device;
    a processor programmed to:
        detect, by a gesture processing thread via a touch sensor associated with the mobile computing device, a request to scroll the web page stored in the memory area;
        request, from a rendering thread, touch point data associated with the detected request, said touch point data identifying one of the scrollable elements associated with the detected request;
        calculate an elapsed time since requesting the touch point data and receipt of the touch point data;
        scroll, by the rendering thread, said one of the scrollable elements when the calculated elapsed time is within the threshold latency stored in the memory area; and
        scroll, by the gesture processing thread, the web page when the calculated elapsed time is not within the threshold latency stored in the memory area, wherein the rendering thread corresponds to a slow response thread and the gesture processing thread corresponds to a fast response thread.

2. The system of claim 1, wherein the processor is further programmed to request the touch point data by requesting at least one of whether a touch point is scrollable, whether the touch point is editable, or a shape of the touch point.

3. The system of claim 1, wherein the plurality of scrollable elements comprises at least one of a frame, a subpane, a panel, or a popup.

4. The system of claim 1, further comprising means for separating gesture processing from rendering processing.

5. The system of claim 1, wherein scrolling by the gesture processing thread includes analyzing the touch point data to correlate the touch point data with a gesture and to determine an operation to be performed on the portion of a web page stored in the memory area based on the gesture.

6. The system of claim 1, wherein scrolling by the rendering thread comprises performing an operation on a current version of the web page.

7. A method comprising:
   detecting, by a first thread, user interaction with a document via a touch sensor associated with a computing device, said first thread handling gesture processing;
   calculating a latency associated with a second thread, said second thread handling rendering of the document, wherein calculating the latency comprises requesting, from the second thread, touch point data associated with the detected user interaction, calculating an elapsed time since said requesting, and determining the latency based at least on the calculated elapsed time;
   comparing the calculated latency to a threshold latency, the threshold latency being based on a perceivable delay in the user interaction;
   determining, based on the comparison, whether to transfer processing of the detected user interaction from the first thread to the second thread;
   processing the detected user interaction by the second thread by scrolling a portion of the document when the calculated latency is less than the threshold latency and the second thread provides the requested touch point data; and
   processing the detected user interaction by the first thread by scrolling the entire document when the calculated latency is greater than the threshold latency and the second thread fails to provide the requested touch point data.

8. The method of claim 7, further comprising:
   receiving, by the first thread, the requested touch point data from the second thread; and
   determining an operation associated with the received touch point data.

9. The method of claim 8, wherein determining the operation comprises identifying a gesture associated with the received touch point data.

10. The method of claim 7, wherein processing the detected user interaction comprises processing, by the first thread, the detected user interaction if the calculated latency is greater than the threshold latency.

11. The method of claim 7, wherein processing the detected user interaction comprises performing, by the second thread, the operation if the calculated latency is less than the threshold latency.

12. The method of claim 7, wherein the detected user interaction corresponds to at least one operation, and wherein processing the detected user interaction by the first thread comprises applying, by the first thread, the operation to a version of the document cached by the computing device.

13. The method of claim 7, wherein the detected user interaction corresponds to at least one operation, and wherein processing the detected user interaction by the second thread comprises applying, by the second thread, the operation to a version of the document stored by another computing device associated with the computing device.

14. The method of claim 7, wherein detecting the user interaction comprises detecting user interaction with a web page.

15. The method of claim 7, wherein requesting touch point data comprises requesting at least one of whether a touch point is scrollable, whether the touch point is editable, or a shape of the touch point.

16. The method of claim 7, wherein the touch point data identifies at least one of a frame, or a scrollable element.

17. One or more computer readable storage media having computer-executable components, said components comprising:
   a user interface component that when executed causes at least one processor to detect, by a fast response thread, user interaction with a document via a touch sensor associated with a computing device, said fast response thread handling gesture processing;
   a touch point component that when executed causes at least one processor to request, from a slow response thread by the fast response thread, touch point data corresponding to the user interaction detected by the user interface component, said slow response thread handling display of the document, said requested touch point data being associated with an operation to be applied to at least a portion of the document;
   a measurement component that when executed causes at least one processor to compare, by the fast response thread, a latency associated with the slow response thread to a threshold latency, the threshold latency being based on a perceivable delay in the user interaction; and
   an overlay component that when executed causes at least one processor to apply, based on the comparison performed by the measurement component, the operation by the fast response thread to the entire document or by the slow response thread to only said portion of the document, wherein the overlay component applies the operation by the fast response thread to the entire document when the latency violates the threshold latency and applies the operation by the slow response thread to only said portion of the document when the latency satisfies the threshold latency.

18. The computer readable storage media of claim 17, wherein the user interaction corresponds to a gesture and the operation includes a scrolling operation.

19. The one or more computer readable storage media of claim 17, wherein the touch point data identifies one or more scrollable elements associated with the document.

20. The one or more computer readable storage media of claim 17, wherein the slow response thread applies the operation to a live portion of the document.

* * * * *